US012795370B2

(12) United States Patent
Lie

(10) Patent No.: US 12,795,370 B2
(45) Date of Patent: Nov. 10, 2026

(54) CONTINUOUS RISK ASSESSMENT FOR MOBILE DEVICES

(71) Applicant: SHIELD AI TECHNOLOGIES PTE. LTD., Singapore (SG)

(72) Inventor: Wee Chian Lie, Singapore (SG)

(73) Assignee: SHIELD AI TECHNOLOGIES PTE. LTD., Singapore (SG)

( * ) Notice: Subject to any disclaimer, the term of this patent is extended or adjusted under 35 U.S.C. 154(b) by 0 days.

(21) Appl. No.: 18/029,033

(22) Filed: Mar. 28, 2023

(65) Prior Publication Data

US 2023/0362651 A1 Nov. 9, 2023

Related U.S. Application Data

(63) Continuation-in-part of application No. PCT/SG2021/050584, filed on Sep. 28, 2021.

(60) Provisional application No. 63/084,655, filed on Sep. 29, 2020.

(51) Int. Cl.
*H04W 12/30* (2021.01)
*H04W 12/122* (2021.01)

(52) U.S. Cl.
CPC ......... *H04W 12/122* (2021.01); *H04W 12/30* (2021.01)

(58) Field of Classification Search
CPC ............................ H04W 12/30; H04W 12/122
USPC ............................................................ 726/16
See application file for complete search history.

(56) References Cited

U.S. PATENT DOCUMENTS

| | | | | |
|---|---|---|---|---|
| 11,005,839 | B1 * | 5/2021 | Shahidzadeh | H04W 12/06 |
| 11,455,641 | B1 * | 9/2022 | Shahidzadeh | H04L 67/306 |
| 2015/0180908 | A1 * | 6/2015 | Dang | H04W 12/37 726/1 |
| 2015/0188924 | A1 | 7/2015 | Mahaffey | |
| 2018/0262533 | A1 * | 9/2018 | McCaig | H04W 12/122 |
| 2018/0367560 | A1 | 12/2018 | Mahaffey | |
| 2022/0318394 | A1 * | 10/2022 | Broome | G06F 21/31 |
| 2024/0396998 | A1 * | 11/2024 | Ashfield | H04M 3/5175 |

FOREIGN PATENT DOCUMENTS

| | | |
|---|---|---|
| CN | 110290522 | 9/2019 |
| WO | 2021053646 | 3/2021 |

OTHER PUBLICATIONS

International Search Report in PCT/SG2021/050584, mailed Jan. 24, 2022.

(Continued)

*Primary Examiner* — Josnel Jeudy
(74) *Attorney, Agent, or Firm* — Wissing Miller LLP

(57) ABSTRACT

A method and a system for enhancing security and fraud prevention from mobile devices running mobile applications includes continuously monitoring the mobile devices for certain triggering events while initiating, loading or running the mobile applications. Upon a triggering event a device fingerprinting routine is run the results of which are transmitted to a risk engine running on a server where it is then analyzed. Based on the analysis, device intelligence information is generated and transmitted back to the mobile device where actions are taken, depending on the potential risk and other factors. This enhancement does not require storing in a server a history of user habits in other circumstances.

16 Claims, 12 Drawing Sheets

(56) References Cited

OTHER PUBLICATIONS

Search Report and Written Opinion in corresponding Singapore Application No. 11202302388V mailed Mar. 21, 2026. (9 pages).
Examiner's Report in corresponding Indonesian Application No. P00202303137 mailed May 20, 2026. (6 pages).

* cited by examiner

CONTINUOUS RISK ASSESSMENT FOR MOBILE DEVICES

REFERENCE TO RELATED APPLICATIONS

This patent application is a continuation-in-part of International Application No. PCT/SG2021/050584 filed Sep. 28, 2021 and published as WO 2022/071881 A1, which claims the benefit of U.S. Provisional Application No. 63/084,655 filed on Sep. 29, 2020, the contents of each are incorporated herein in their entirety by reference.

This patent application is related to and incorporates by reference each of the following International patent applications and U.S. Provisional patent applications:

Int'l Pat Appl. Ser. No. PCT/1B2020/058799 filed on Sep. 21, 2020, published as WO2021/053646 with publication date Mar. 25, 2021;

Int'l Pat. Appl. Ser. No. PCT/IB2020/058801 filed on Sep. 21, 2020, published as WO2021/053647 with publication date Mar. 25, 2021;

U.S. Prov. Ser. No. 62/950,007 filed Dec. 18, 2019;
U.S. Prov. Ser. No. 62/949,993 filed Dec. 18, 2019;
U.S. Prov. Ser. No. 62/949,987 filed Dec. 18, 2019;
U.S. Prov. Ser. No. 62/949,979 filed Dec. 18, 2019;
U.S. Prov. Ser. No. 62/949,974 filed Dec. 18, 2019;
U.S. Prov. Ser. No. 62/949,965 filed Dec. 18, 2019;
U.S. Prov. Ser. No. 62/949,828 filed Dec. 18, 2019;
U.S. Prov. Ser. No. 62/949,816 filed Dec. 18, 2019;
U.S. Prov. Ser. No. 62/903,798 filed Sep. 21, 2019;
U.S. Prov. Ser. No. 62/903,797 filed Sep. 21, 2019; and
U.S. Prov. Ser. No. 62/903,796 filed Sep. 21, 2019.

All of the above-referenced international and provisional patent applications are collectively referenced herein as "the commonly assigned incorporated applications."

FIELD

This disclosure generally relates to enhancing the security of an electronic device communicating with a server. More particularly, some embodiments relate to enhancing the security of a mobile device making use a current and previous fingerprint of parameters of the mobile device taken at the device while the mobile application is initiated, loaded or is running on the mobile device.

BACKGROUND

Digital platforms in the form of mobile applications on mobile devices have come to rely on identifying a user's mobile device and its attributes to establish customer trust and prevent fraud. This is conventionally done through device fingerprinting, which enables the digital platform to assign an identifier to the mobile device, as well as record the device attributes of that device. Digital platforms profile a device and assess it for risk. This is conventionally done only once, either at the point where the mobile application first registers the device, or on an ad-hoc basis, such as when a risk assessment for the device is deemed to be necessary or desirable. In one example discussed in US patent publication US 2018/0367560, risk assessment involves comparing a current state of a mobile device with a long history of how the mobile device user has run other applications.

SUMMARY

According to some embodiments, a method for continuously assessing risk on a mobile device running a mobile application is described. The method includes: on the mobile device, continuously monitoring a plurality of parameters associated with the mobile application for one or more predetermined triggering events; on the mobile device, upon detecting one more of the triggering events, executing a fingerprinting routine configured to obtain a current state of a plurality of device fingerprint attributes; transmitting the current state of the plurality of device fingerprint attributes to a risk engine running on a server; analyzing with the risk engine the current state of the plurality of device fingerprint attributes to obtain device intelligence information, the analyzing includes comparing the current state of the plurality of device fingerprint attributes with a previously obtained state of a the plurality of device fingerprint attributes; transmitting the device intelligence information to the mobile device; and on the mobile device, undertaking one or more actions based on the intelligence information received from the server.

According to some embodiments, the method also includes saving to database information indicative of the current state of a plurality of device fingerprint attributes. According to some embodiments, the information indicative of the current state of a plurality of device fingerprint attributes is a delta between the device fingerprint attributes at a current state and a previous state.

According to some embodiments, the device intelligence information includes a quantitative risk score that indicated the level of risk associated with the current mobile app session. The device intelligence can also include qualitative information indicative of what types of trigger events are associated with the current mobile app session.

According to some embodiments, the actions undertaken by the mobile device can include one or more of the following: continue monitoring the mobile device, send the user a warning, terminate a user running the mobile application, and shut down the mobile application.

According to some embodiments, the predetermined triggering events includes one or more event types selected from a list consisting of: a risk module is installed; a risk module is initialized; the mobile application is resumed; a display configuration has been changed; a screenshot is taken; a GPS provider change is detected; a network change is detected; and a change in tools is detected.

According to some embodiments, the plurality of device fingerprint attributes includes fingerprint attributes from one or more of the following attribute categories: device hardware; network; software; screen; and location.

According to some embodiments, a system for continuously assessing risk on a mobile device running a mobile application is described. The system includes: a mobile application running on a mobile device, the mobile application configured to continuously monitor a plurality of parameters associated with the mobile application for one or more predetermined triggering events, and upon detecting one more of the triggering events, execute a fingerprinting routine configured to obtain a current state of a plurality of device fingerprint attributes, and transmit the current state of the plurality of device fingerprint attributes to a risk engine running on a server; and a server running a risk engine platform configured to analyze the received current state of the plurality of device fingerprint attributes to obtain device intelligence information, the analysis includes comparing the current state of the plurality of device fingerprint attributes with a previously obtained state of a the plurality of device fingerprint attributes, and transmit the device intelligence information to the mobile device, wherein the mobile application is further configured to undertake one or more actions based on the intelligence information received from the server.

As used herein, the grammatical conjunctions "and", "or" and "and/or" are all intended to indicate that one or more of the cases, object or subjects they connect may occur or be present. In this way, as used herein the term "or" in all cases indicates an "inclusive or" meaning rather than an "exclusive or" meaning.

As used herein the terms "library" and "database" are used interchangeably, and both terms refer herein to a collections of digital content and/or data that is stored and can be accessed electronically from a computer system. As used herein, the terms "library" and "database" can also refer to models such as trained models that include features (e.g. vectors of coefficients and weightings) and procedures (logic) that can be used to identify the presence and/or usage of malicious tools.

Although the term "tool" is sometimes understood to be designed for a specific use case, and the term "application" is sometimes understood to refer to a larger, more complex piece of software, as used herein the terms "tool" and "application" are used interchangeably.

BRIEF DESCRIPTION OF THE DRAWINGS

To further clarify the above and other advantages and features of the subject matter of this patent specification, specific examples of embodiments thereof are illustrated in the appended drawings. It should be appreciated that these drawings depict only illustrative embodiments, and are therefore not to be considered limiting of the scope of this patent specification or the appended claims. The subject matter hereof will be described and explained with additional specificity and detail through the use of the accompanying drawings in which:

DETAILED DESCRIPTION

Figure 1:
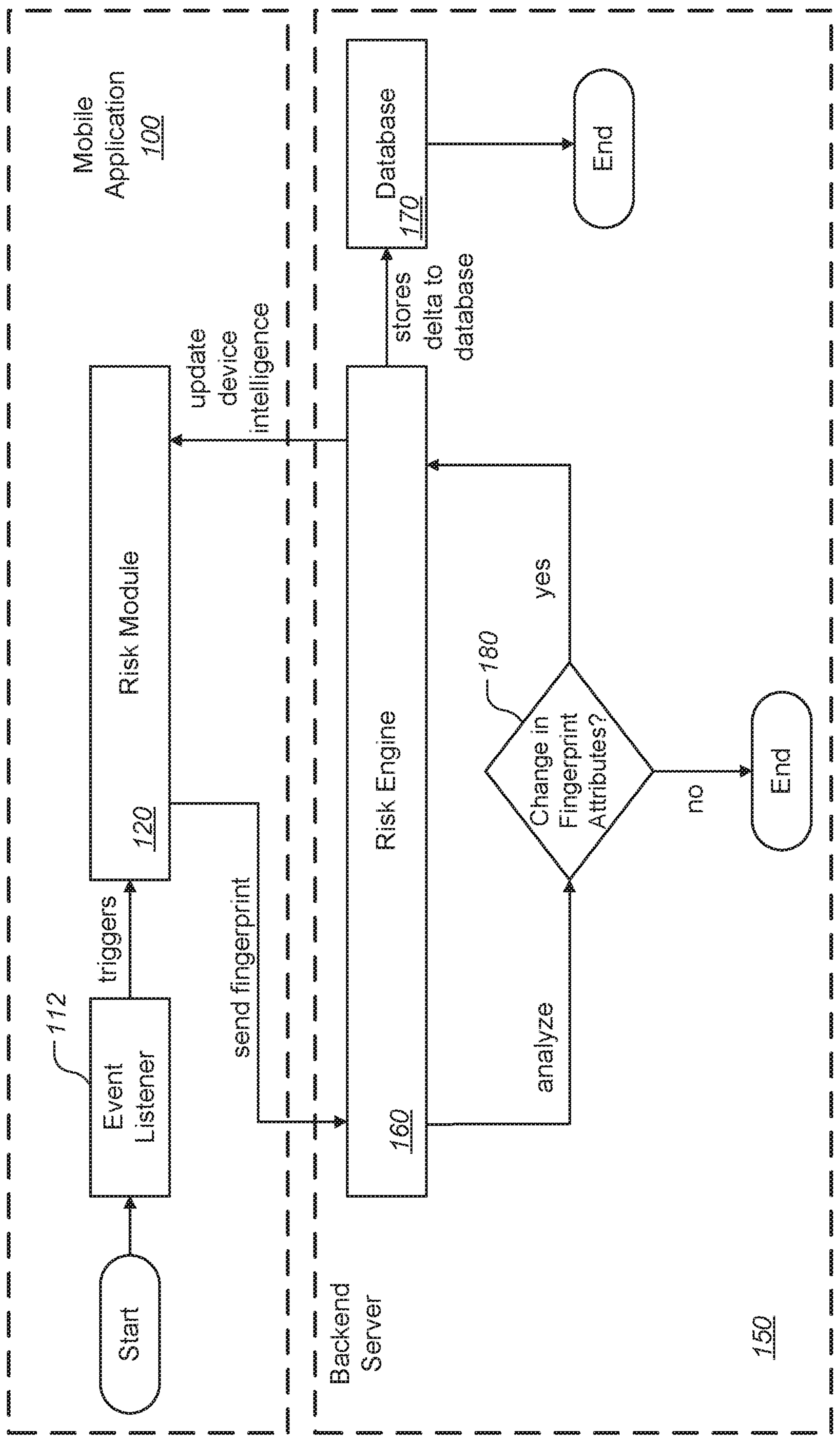
FIG. 1 is a schematic block diagram illustrating an overview of a system for continuous risk assessment for a mobile device, according to some embodiments.

A detailed description of examples of preferred embodiments is provided below. While several embodiments are described, it should be understood that the new subject matter described in this patent specification is not limited to any one embodiment or combination of embodiments described herein, but instead encompasses numerous alternatives, modifications, and equivalents. In addition, while numerous specific details are set forth in the following description in order to provide a thorough understanding, some embodiments can be practiced without some or all of these details. Moreover, for the purpose of clarity, certain technical material that is known in the related art has not been described in detail in order to avoid unnecessarily obscuring the new subject matter described herein. It should be clear that individual features of one or several of the specific embodiments described herein can be used in combination with features of other described embodiments or with other features. Further, like reference numbers and designations in the various drawings indicate like elements.

Device fingerprinting enables the digital platform to assign an identifier to the mobile device, as well as record the device attributes of that device. Digital platforms profile a device and assess it for risk. This is conventionally done only once, either at the point where the mobile application first registers the device, or on an ad-hoc basis, such as when a risk assessment for the device is deemed to be necessary or desirable. However, fraudsters can circumvent these defense mechanisms by using device modification tools, and using them selectively, at only certain junctures, which can evade detection. According to some embodiments, risk assessment of a mobile device is conducted continuously throughout a user's session on a mobile application. According to some embodiments, the risk assessment is carried out based upon a predetermined set of triggers and without a need to involve a history of the device or its user over long periods of time preceding a current session or storing such history on a server and using it to generate threshold for comparison with a current session. This new approach to enhancing security improves operation of a mobile device and of a server with which the device communicates and reduces communication bandwidth requirements. For example, as discussed further below, in accordance with the new approach to device security [security and fraud prevention?], the device only needs to compare two states of device parameters, a state upon a detection of a trigger event and a state at an earlier time that can be during loading or running the same mobile application session. Further, the amount of data that needs to be transmitted between the mobile device and the server and stored on the server is reduced compared with known prior fraud detection schemes that rely on a long history of a device and its user. Still further, storage requirements and processing burdens at a server are reduced compared with a known prior scheme by nor relying on a long history of the device and its user that the server would keep and compare with a current state of running a mobile application.

A mobile application "lifecycle" can be defined as a software process which starts when the mobile application is launched by the user and ends when the application is terminated manually by the user or terminated automatically by the operating system of the device during its memory management procedures. The mobile application usually transits between different states depending on how a user interacts with the application. Some of the common state transitions within the application lifecycle occur while launching the application, navigating from the application back to the device home screen, or switching between applications through the multitasking window.

Due to the reactive nature of the application lifecycle which automatically invokes state changes whenever a user interacts with the device, it can be used to detect the instance when a potential malicious activity is performed and proactively reassess the device to provide a fresh set of device indicators. As one of many examples, suppose that a malicious actor is disguising themself as a "good actor" to hide malicious intent. With the new approach described in this patent specification, the malicious actors are caught right at the moment when they turn bad. In this example, the malicious actor is a driver in a service such as Uber and opens a ride-hailing app with the malicious intent to add more distance to his trip by changing GPS coordinates. The malicious actor first opens the app without turning on any GPS spoofer service. Fingerprinting routine 200 is run by risk module 120 (within the ride-hailing mobile app). The malicious actor then finds a passenger. Just before starting the ride, the malicious actor turns on a GPS spoofer service. When the GPS spoofer service is detected, the GPS provider change event is detected by event listener 112. The risk module 120 is triggered, and the device is re-fingerprinted. Turning on a GPS spoofer service will change the GPS provider of the device. In this example, this change in the device fingerprint will result in in detection of a malicious act within a single session of the mobile act, without a need to involve a long history of prior sessions of the device or user.

FIG. 1 is a schematic block diagram illustrating an overview of a system for continuous risk assessment for a mobile device, according to some embodiments. The system has some components that run on mobile application 100 that is being executed on the mobile device. The system also has some components that run on a backend server 150. This mobile application 100 includes both an event listener module 112 and a risk module 120. The event listener 112 in the mobile device is configured to observe or listen during the application lifecycle for certain predetermined triggers. According to some embodiments, the triggers include one or more of the following: the risk module 120 is installed; the risk module 120 initialized; the mobile application 100 is resumed (e.g., after being paused); the display configuration has been changed; a screenshot is taken; a GPS provider change is detected; a network change is detected; and a change in the tools is detected. Notably, the mobile device detects and responds to these triggers, without a need to involve the server at this time point and thus require bandwidth for the purpose.

Upon detecting a trigger by the event listener 112, the risk module 120 on the mobile device runs a fingerprinting routine and sends the updated current fingerprint to risk engine 160 on the backend server 150. The fingerprint data is analyzed and a determination 180 is made whether or not the fingerprint attributes have changes. If there has been no change from an earlier fingerprint in the session the process "ends" which means no further action is taken based on the trigger event. If fingerprint attribute(s) have changes then, the risk engine 160 stores the change(s) in the database 170 and updates the risk module 120 with the new device intelligence. The device intelligence outputs generated can be used wholly independently, referenced as part of a decision-making framework, or ingested as inputs into a larger system that derives its own conclusions and/or actions. When it comes to acting on the device intelligence received during the continuous risk assessment of mobile devices during a user session, the possible actions include, but are not limited to incentive-based, punitive, and passive actions (no action or monitoring mode only).

According to some embodiments, the fingerprinting attributes include one or more of the following categories: Device Hardware; Network; Software; Screen; Location and Miscellaneous. According to some embodiments examples of those categories can include one or more of the following: Device Hardware—Device Brand, Device Name, Device Model, IMEI, Battery Level, Battery Temperature, Brand, Manufacturer, Model, Hardware, Host, Device, ID and CPU; Network—Carrier Name, Carrier Country, Battery Technology, Battery Voltage, Battery Health, Carrier Country Code, Carrier Network Code, WIFI Name, WIFI IP Address and WIFI MAC Address; Software—OS Version, Merchant App Version, Version Incremental, Version Release and Version Codename; Screen—Screen Resolution, Screen Size, Pixel Density and Display; Location—GPS Country, GPS Coordinates, IP Country and IP Address; and Miscellaneous—Time zone, User Language and User Agent.

Figure 2:
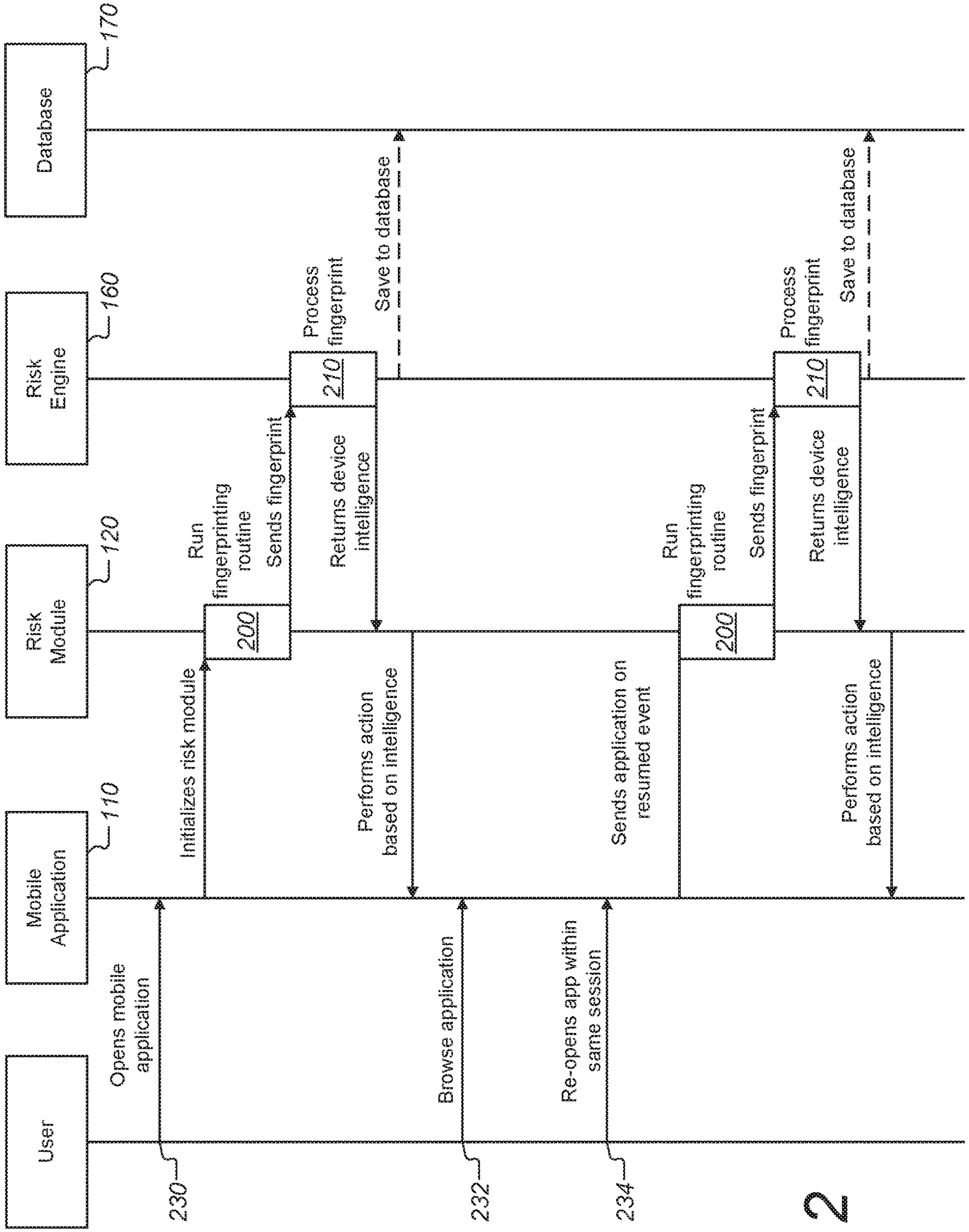
FIG. 2 is a schematic block diagram illustrating flow characteristics of a system for continuous risk assessment for a mobile device, according to some embodiments.

FIG. 2 is a schematic block diagram illustrating flow characteristics of a system for continuous risk assessment for a mobile device, according to some embodiments. As can be seen from the diagram, at time 230 the user opens the module application 110, which causes the risk module 120 to initialize. According to some embodiments, initializing the risk module 120 is trigger event so the fingerprinting routine 200 is run. The fingerprint is sent from risk module 120 to the risk engine 160 (on the backend server). For each fingerprint sent to the processor engine 210, the entire fingerprint will be scanned to identify any change in attributes pertaining to fraud. When there is no change in fingerprint attributes, the processor engine will drop the process. When there is a change in fingerprint attributes, the risk engine 160 will identify the delta between the current fingerprint and the most recent fingerprint of the same session. It will then perform two things: (1) send an updated intelligence back to the device; and (2) store the relevant delta to the database. Action is performed based on the updated intelligence, which is described in further detail infra. At time 232, the browsing of the application without any trigger events does not cause any activity by the risk module 120 or risk engine 160. At time 234 the user re-opens the mobile application 110. If resuming or re-opening the mobile app 110 is the trigger event, then the mobile app 110 sends the application on the resuming event to the risk module 120 and the fingerprinting routine 200 is run. The fingerprint is sent to the risk engine 160 where it is processed 210. According to some embodiments, the processing 210 includes comparing the current fingerprint with the prior saved fingerprint. If there is a change, the device intelligence information is sent back to the risk module 120. According to some embodiments, the device intelligence can include a quantitative risk score that indicates the level of risk associated with the current mobile app session. For example, the risk score could be weighted score between 0 and 100. According to some embodiment, the device intelligence can also include qualitative information such as what types of triggers and/or risks are associated with the current mobile app session. For example, the device intelligence can include the type of triggering event(s). According to some embodiments, device intelligence can also include one or more recommended risk decisions to allow/block an activity based on predefined policies to cater to business use cases of the application provider's organization. For further details of device intelligence see, e.g., Int'l Pat. Appl. Ser. No. PCTi1B2020/058799 filed on Sep. 21, 2020, published as WO2021/053646 with publication date Mar. 25, 2021, and Int'l Pat. Appl. Ser. No. PCTi1B2020/058801 filed on Sep.

21, 2020, published as WO2021/053647 with publication date Mar. 25, 2021, both of which are incorporated herein by reference. The mobile application then takes action based on the received intelligence. In general, the action taken based on the intelligence will depend on the nature of the risk, the level of the risk, the type of mobile application, and the relationship between the mobile app provide and the user. The action taken can include, but are not limited to: (1) do nothing and continue with normal operations (e.g. if the certain triggers are not met and/or risk level is relatively low); (2) continue monitoring the device and the user account (e.g. when a subset of indicators show elevated risk); (3) send the user a warning through the app or other channels; (4) terminate the user from the mobile app and/or shut down the mobile app temporarily or permanently. The fingerprint data is also saved to the database 170. According to some embodiment, only the change, or delta, of the fingerprint is saved to the database 170.

Efficient Process. While it is beneficial to have more data, meaning more frequent processing and analysis of fingerprints, this may impact the latency. This is especially true when processing power is used to process duplicate fingerprints within the same session. According to some embodiments, throughout one application life cycle, a list of trigger events is curated so that it efficiently and/or optimally covers most of the potential fraud points pertaining to one session. With this, only useful fingerprints are processed, hence latency of the real-time risk decisioning will often not be compromised.

Efficient Comparison. A single device fingerprint typically contains hundreds or thousands of data points and it will take time if a comparison of data point by data point is carried out to identify changes. Moreover, some points that have changed may not have any significant impact on the risk profile of the device. According to some embodiments, a set of identifiers are used that can efficiently identify when a risk profile of the device has changed. According to some embodiments the set of identifiers include one or more of the following: risk indicators; proprietary risk score; and ID hash.

Efficient Storage. While it is good to store as much data collected as possible, it is desirable to determine the balance between storing as much data as possible and reducing the storage cost. According to some embodiments, table is configured in such a way that only the delta of the fingerprint attributes are stored whenever a change in fingerprint is detected.

Figure 3:
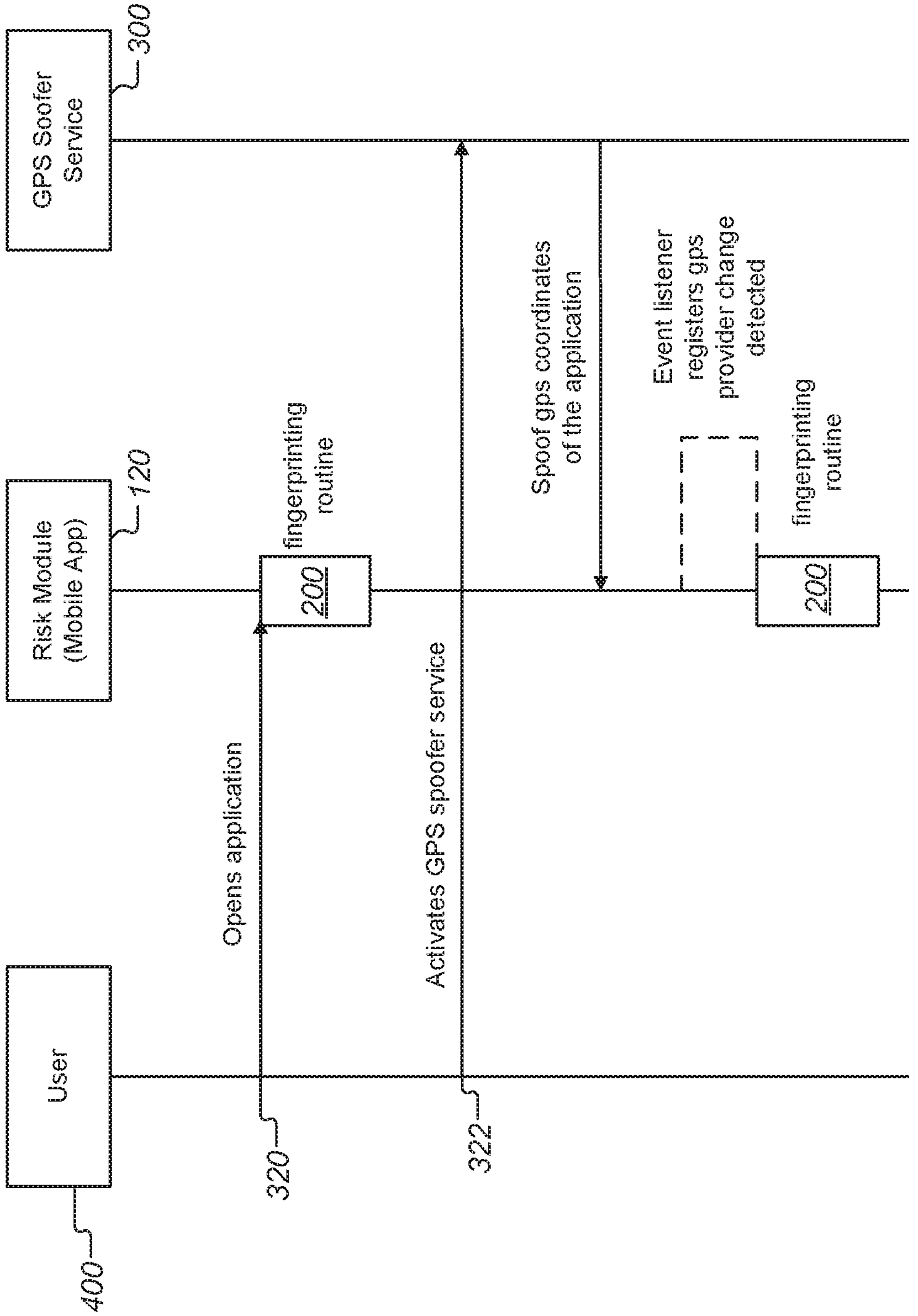
FIGS. 3 and 4 are schematic block diagrams illustrating a use case for detecting a GPS provider change on a mobile device by a system for continuous risk assessment, according to some embodiments.
Figure 4:
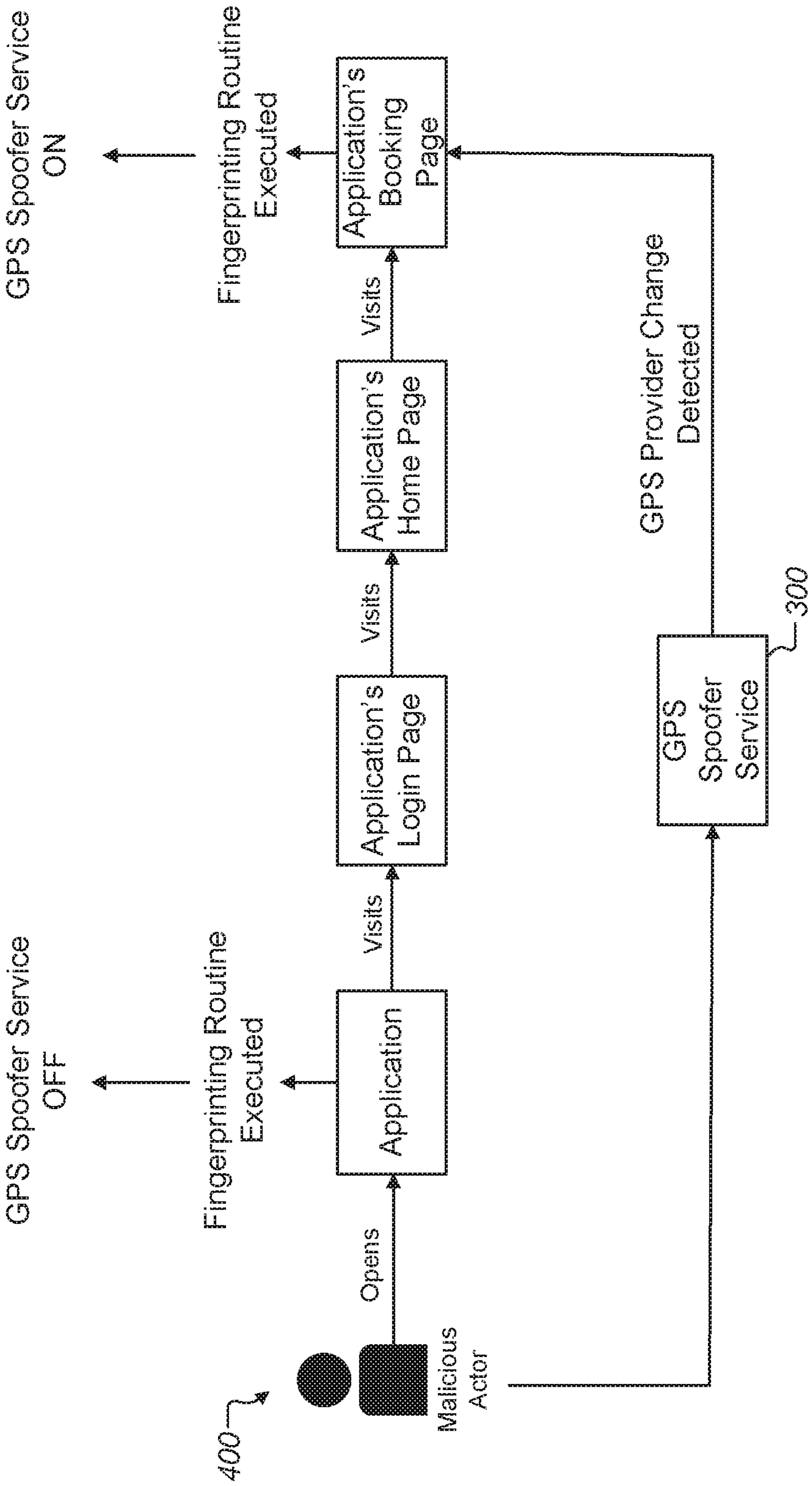

FIGS. 3 and 4 are schematic block diagrams illustrating a use case for detecting a GPS provider change on a mobile device by a system for continuous risk assessment, according to some embodiments. In this example, a malicious actor 400 is disguising themself as a "good actor" to hide their malicious intent. With the continuous risk assessment system described, the malicious actors are caught right at the moment when they turn bad. Malicious actor (driver) 400 opens a ride-hailing app with the malicious intent to add more distance to his trip by changing his GPS coordinates. In FIG. 3, at time 320, malicious actor 400 first opens the app without turning on any GPS spoofer service. Fingerprinting routine 200 is run by risk module 120 (within the ride-hailing mobile app). The malicious actor 400 then finds a passenger. Just before starting the ride at time 322 in FIG. 3, the malicious actor 400 turns on the GPS spoofer service 300. When the GPS spoofer service is detected, the GPS provider change event is detected by the event listener (shown in FIG. 1). The risk module is triggered, and the device is re-fingerprinted as shown in FIG. 3. Turning on a GPS spoofer service will change the GPS provider of the device. In this use case, a ride-hailing company (such as Uber and/or Lyft) may opt to monitor the usage of GPS spoofers as a sign that their employees and/or partners (drivers) have been dishonest. The ride-hailing company has several options upon receiving the device intelligence during the continuous risk assessment These options include, but are not limited to: (1) do nothing and continue with normal operations if all indicators are normal (for example, if no GPS spoofer use was detected and the risk score is within acceptable range); (2) continue monitoring the device and the driver account if only some indicators show elevated risk (for example, if no GPS spoofer use was detected, but the risk score is in the moderate range); (3) send the driver a warning through the app or other channels—such as using a text message or email, if indicators reflect the contravention of company policy (for example, if the use of a GPS spoofer was detected), signaling risk of the driver conducting fraud (inflating travel distance, getting preferential bookings, etc); and/or (4) as a variation of (3), the company could also elect to kick the current driver out of the app and shut down the app or potentially even deregister the driver.

Figure 5:
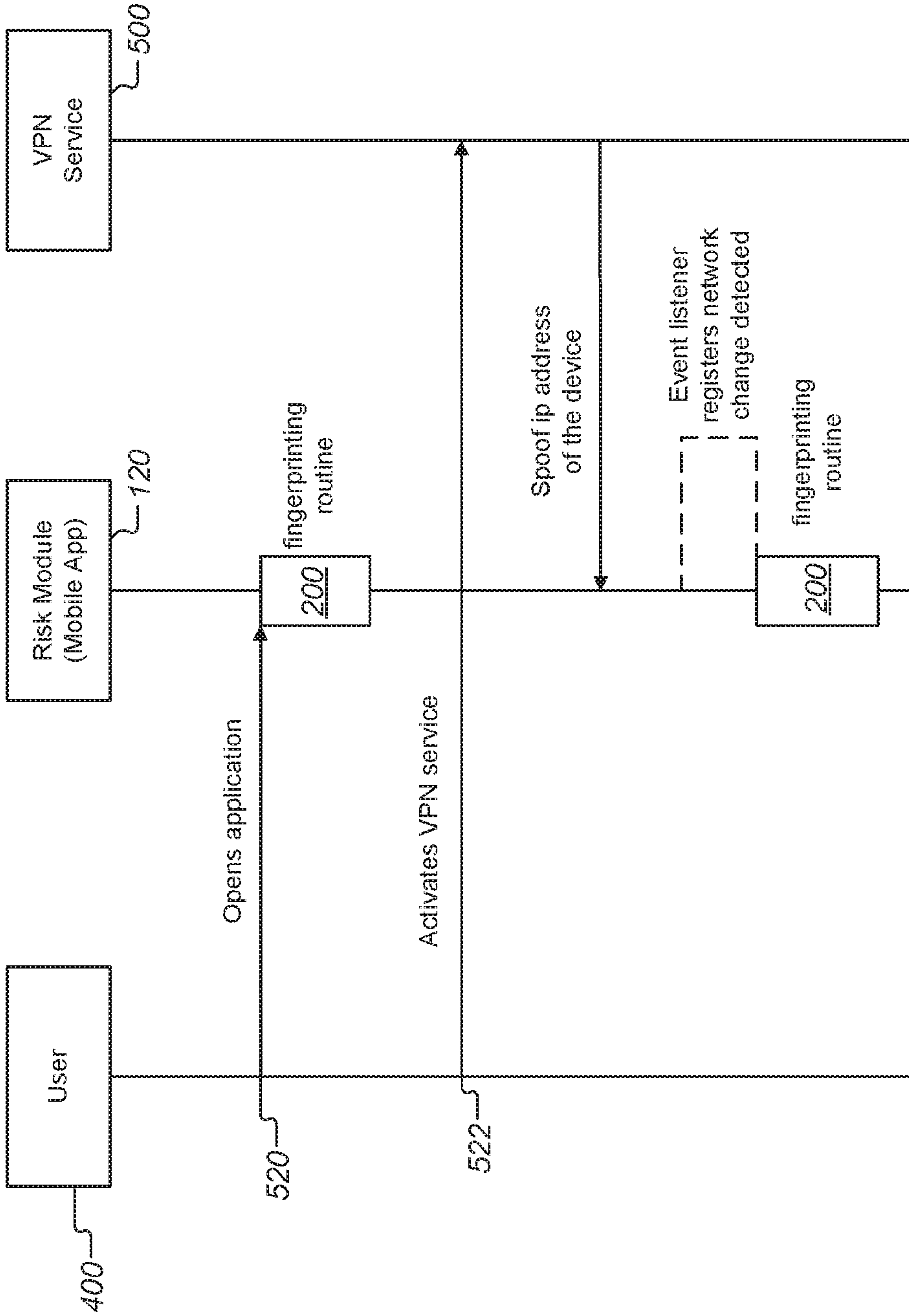
FIGS. 5 and 6 are schematic block diagrams illustrating a use case for detecting a network change on a mobile device by a system for continuous risk assessment, according to some embodiments.
Figure 6:
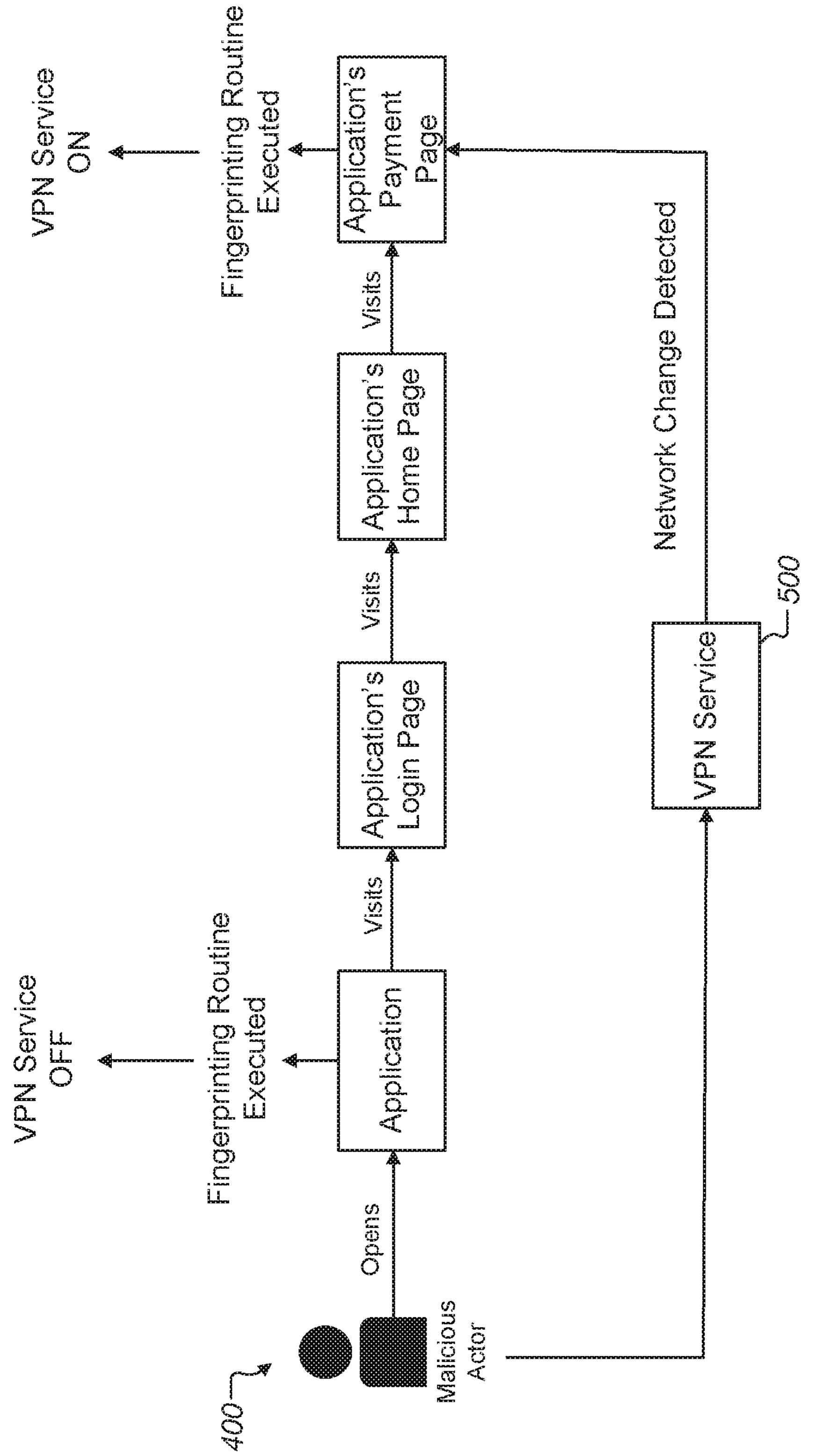
Figure 7:
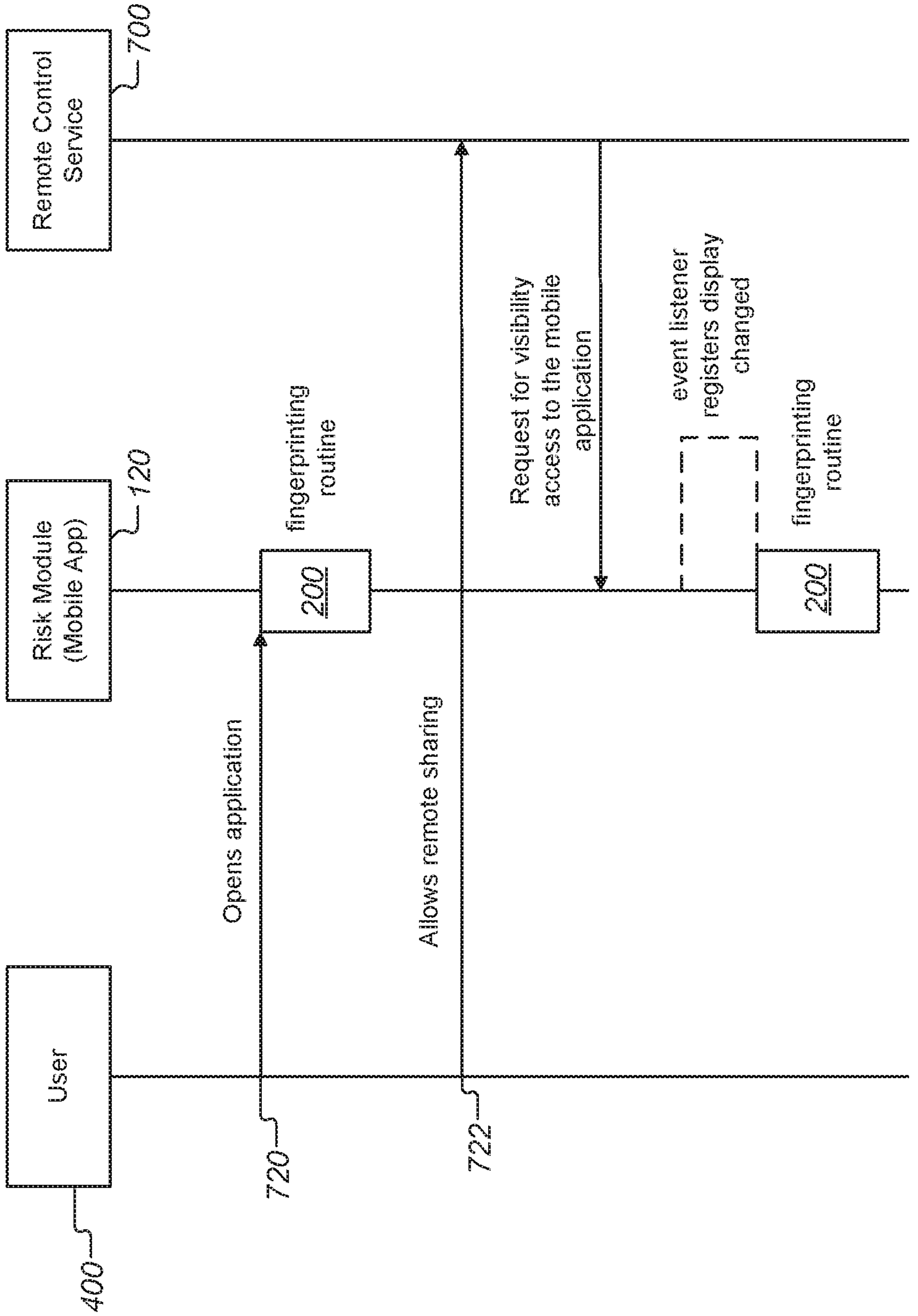
FIGS. 7 and 8 are schematic block diagrams illustrating a use case for detecting a display change on a mobile device by a system for continuous risk assessment, according to some embodiments.
Figure 8:
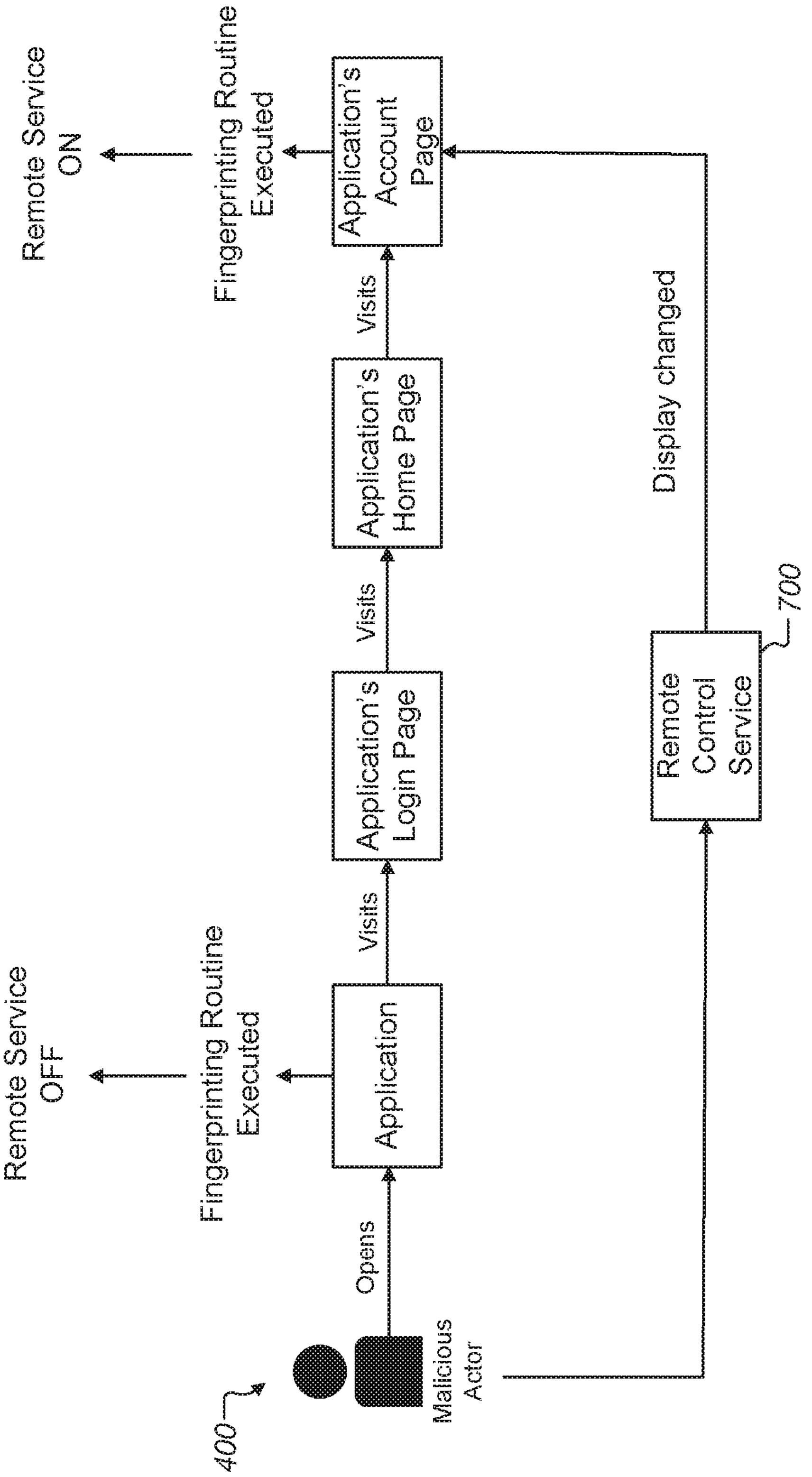

FIGS. 5 and 6 are schematic block diagrams illustrating a use case for detecting a network change on a mobile device by a system for continuous risk assessment, according to some embodiments. In this example, a malicious actor 400 again disguises themselves as a good actor to hide their malicious intent. With the continuous risk assessment system described, the malicious actors are caught just as they reveal their malicious intent. Malicious actor 400 opens a paid media streaming application with the malicious intent to purchase the content at a cheaper price by changing his geographic location. In FIG. 5, at time 520, malicious actor 400 first opens the app without turning on any VPN. Fingerprinting routine 200 is run by risk module 120 (within the media streaming app). The malicious actor 400 then visits the payment page. Just before the purchase, the malicious actor 400 will turn on the VPN service 500. When the VPN service is turned on, the network change is detected by the event listener (shown in FIG. 1). The risk module is triggered, and the device is re-fingerprinted as shown in FIG. 5. Turning on a VPN will change the network the mobile device is connected to. With the new intelligence being passed to the device, the media streaming app can flag the malicious actor right before performing the malicious activity. in this use case, a content-streaming service (such as Netflix or Disney) may opt to monitor the usage of VPNs as a sign that their users are taking advantage of them. These could possibly range from price arbitrage, to abuse of account sharing or account takeovers, and more. The content-streaming service has several options upon receiving the device intelligence during the continuous risk assessment. These options include, but are not limited to: (1) do nothing and continue with normal operations if all indicators are normal (for example, if no VPN use was detected and the risk score is within acceptable range); (2) continue monitoring the device and the user account if only some indicators show elevated risk (for example, if no VPN use was detected, but the risk score is in the moderate range); (3) send the user a warning through the app or other channels—such as using a text message or email, if indicators reflect the contravention of company policy (for example, if the use of a VPN was detected), signaling risk of the user conducting fraud (subscribing to a cheaper plan by changing the IP address to a country with cheaper price plans, sharing accounts with users outside of their family, etc); (4) as a variation of (3), the company could also elect to kick the current user out of the app and shut down the app or potentially even ban and unsubscribe the user; and (5) if the suspected issue is an account takeover, where a rogue user has taken over an account, the invader can be shut out and the account locked until the real user can be alerted and remedy is possible FIGS. 7 and 8 are schematic block diagrams illustrating a use case for detecting a display change on a mobile device by a system for continuous risk assessment, according to some embodiments. In this example a malicious actor 400 hides their true malicious intent. With the described continuous risk assessment system, the malicious actor 400 is caught just prior to the malicious action. The malicious actor (hacker) 400 utilizes remote access to allow better control over the application. In FIG. 7, at time 720, malicious actor 400 first opens the app without any remote control service enabled. The malicious actor then visits the account page. Just before changing any information on the account, the malicious actor 400 turns on the remote control service 700. When the remote control service 700 is enabled, the display change is detected by the event listener (shown in FIG. 1). The risk module 120 is triggered and the device is re-fingerprinted as shown in FIG. 7. Turning on the remote control service 700 will add an additional display to the device and hence trigger a change in the display. With the new intelligence being passed to the device, the mobile app can flag the malicious actor 400 just before performing the malicious activity. In this use case, an app with sensitive information (such as banking apps) may opt to monitor the usage of remote-access tools or screen-sharing tools as a sign that their accounts are being targeted by hackers and fraudsters. These could possibly range from fraudsters stealing content, hackers stealing sensitive information and more. These apps have several options upon receiving the device intelligence during the continuous risk assessment. These options include, but are not limited to: (1) do nothing and continue with normal operations if all indicators are normal (for example, if no remote access was detected and the risk score is within acceptable range); (2) continue monitoring the device and the user account if only some indicators show elevated risk (for example, if no remote access was detected, but the risk score is in the moderate range); (3) send the user a warning through the app or other channels—such as using a text message or email, if indicators reflect the contravention of company policy (for example, if remote access was detected), signaling risk of the user conducting fraud (stealing content by copying/using screenshots/screen-recording) or unknowingly being a victim of fraud; (4) as a variation of (3), the company could also elect to kick the current user out of the app and shut down the app or potentially even ban and unsubscribe the user; (5) if the current user is a victim of fraud—fraudster masquerading as customer service agent and obtaining sensitive data such as names, emails, phone numbers, credit card numbers, PINs, etc through the remote access screen sharing, the current session can be terminated, and the account locked until the user can be alerted and remedy is possible.

Figure 9:
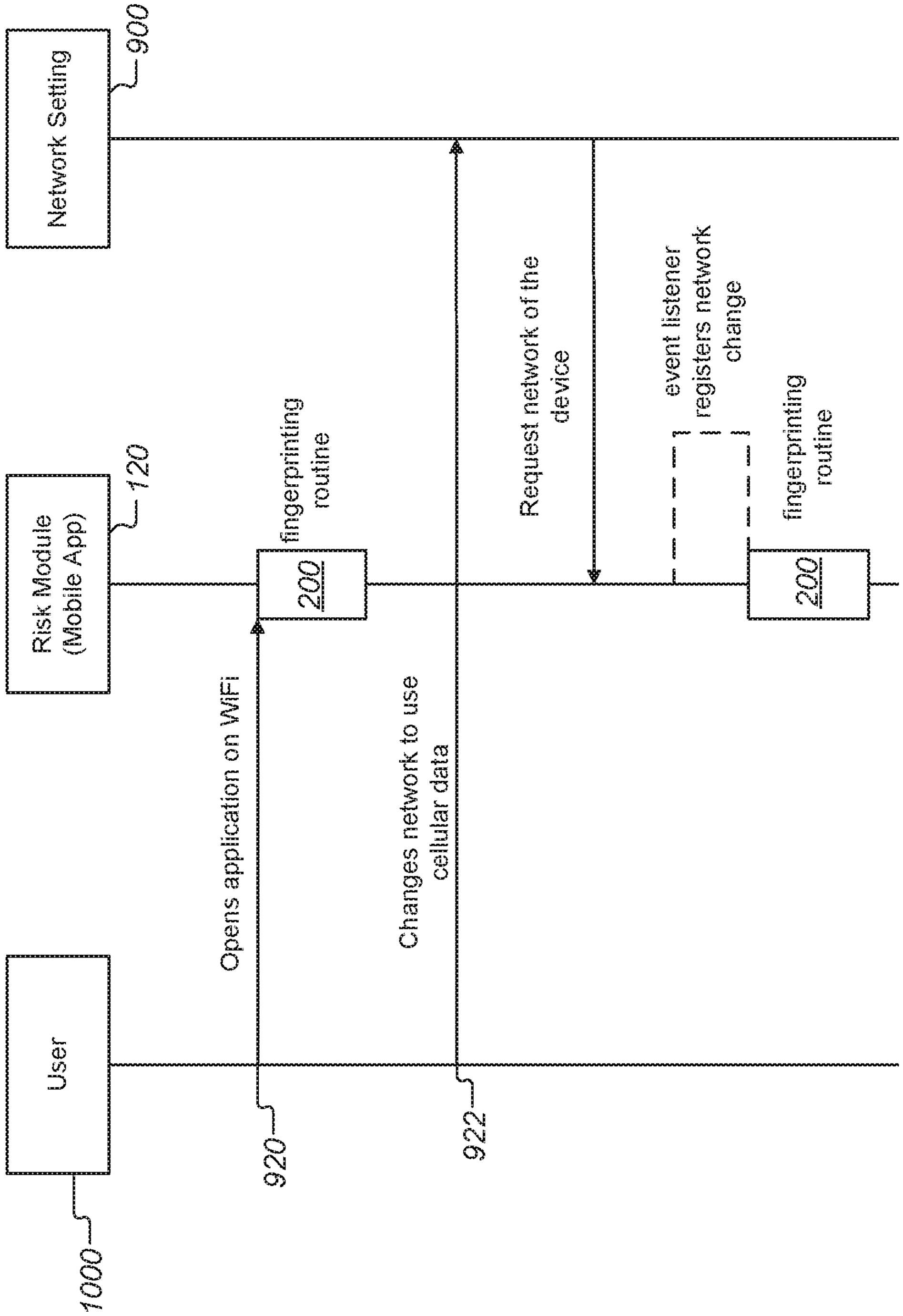
FIGS. 9 and 10 are schematic block diagrams illustrating a use case for detecting a network change on a mobile device by a system for continuous risk assessment, according to some embodiments.
Figure 10:
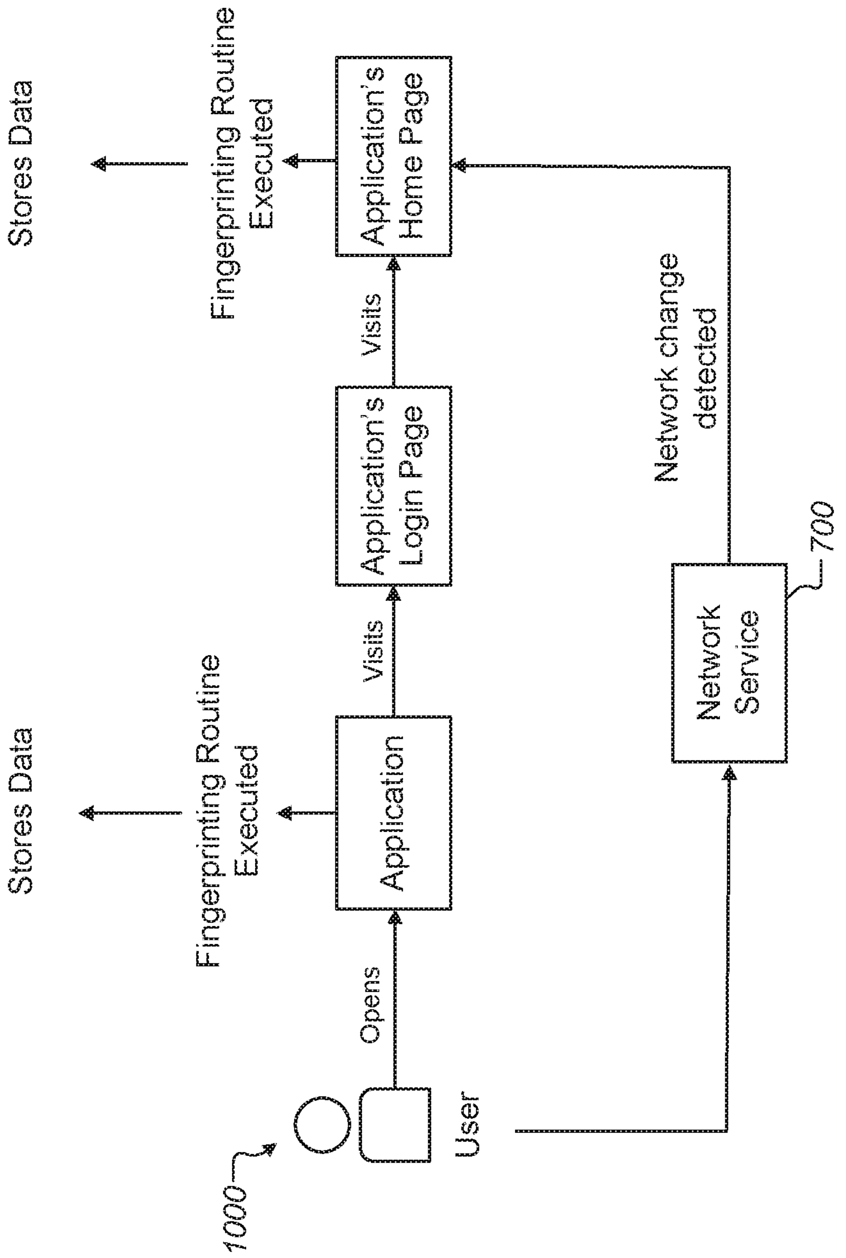

FIGS. 9 and 10 are schematic block diagrams illustrating a use case for detecting a network change on a mobile device by a system for continuous risk assessment, according to some embodiments. According to some embodiments, continuous device profiling can help merchants to learn the behavior of the user throughout the session of using the app. The described system can analyze how frequently a user switches between carrier and Wi-Fi throughout a single session. In FIG. 9, at 920 user 1000 first opens the app with his carrier data to access the content of the page. After some time, at 922 the same user 1000, in the same session, changes his carrier data to a Wi-Fi network. At the instance of the switch, the network change is detected event is triggered and the device is re-fingerprinted. Data about this change is stored in the database for further analytics. An analysis of how frequent users switch between networks on a particular page of the mobile application can be concluded, and relevant actions can be taken. In this use case, any mobile app could opt to monitor network changes on the mobile app. The utility that this insight provides includes but are not limited to 1) improving the user experience, or 2) detecting potential fraud. A mobile app has several options upon receiving the device intelligence during the continuous risk assessment. These options include, but are not limited to: (1) do nothing and continue with normal operations if all indicators are normal (for example, if no network change was detected and the risk score is within acceptable range); (2) continue monitoring the device and the user account if only some indicators show elevated risk (for example, if no network change was detected, but the risk score is in the moderate range); (3) send the user a warning through the app or other channels—such as using a text message or email, if indicators reflect significantly elevated risk (for example, if multiple risk indicators were positive, and the risk score is in the high-risk region), signaling risk of the user conducting fraud; (4) if the current user is a victim of fraud, the current session can be terminated, and the account locked until the user can be alerted and remedy is possible; (5) send the user a warning that higher data consumption is a likely event (for example, if the user was detected to have switched from Wi-Fi to cellular data, when using a media-streaming app); and (6) log the device intelligence and any useful data points for future analytics to help improve the user experience.

Figure 11:
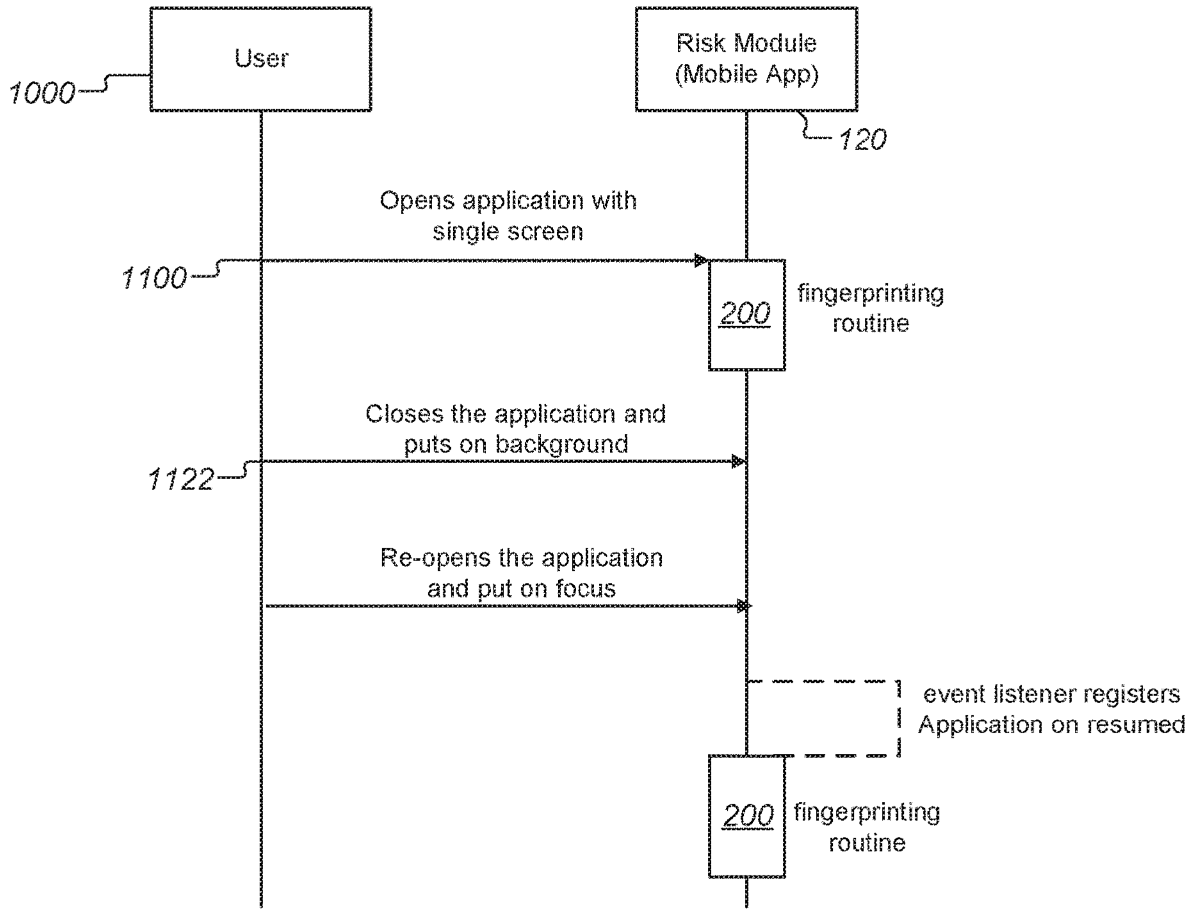
FIGS. 11 and 12 are schematic block diagrams illustrating a use case for detecting a resumed application on a mobile device by a system for continuous risk assessment, according to some embodiments.
Figure 12:
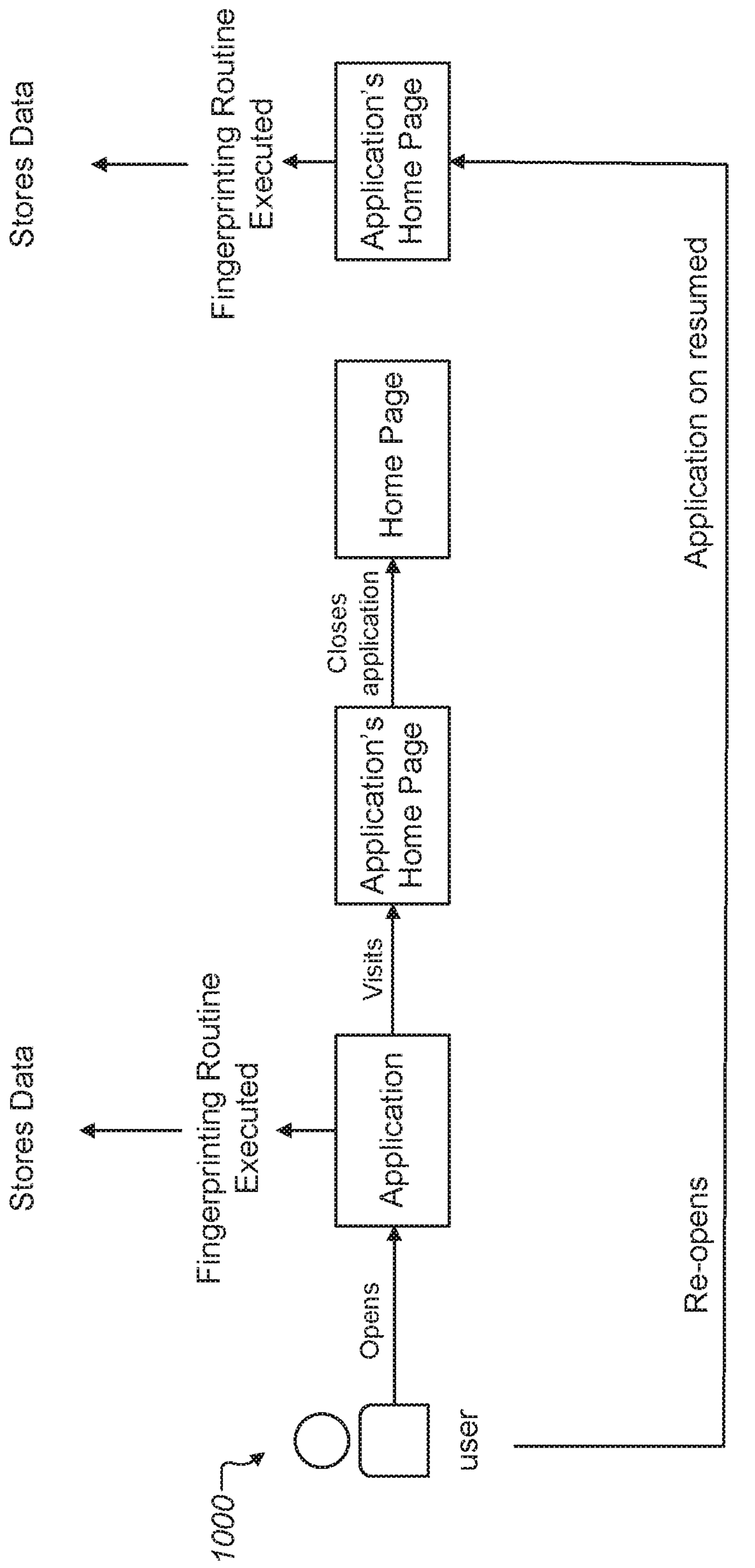

FIGS. 11 and 12 are schematic block diagrams illustrating a use case for detecting a resumed application on a mobile device by a system for continuous risk assessment, according to some embodiments. According to some embodiments, continuous device profiling can help merchants to learn the behavior of the user throughout the session of using the app. The described system can analyze the number of times a user puts the application on background throughout a single session. In FIG. 11, at 1120, user 1000 first opens the mobile application 120 and performs relevant tasks on that mobile app. After some time on the application, at 1122 the user 1000 will put the application in the background and switch over to another application. When the user returns, the application on resumed event is triggered and the device is re-fingerprinted. Data about this change is stored in the database for further analytics. An analysis of low frequent users change between display options can be concluded, and relevant actions can be taken.

In this use case, any mobile app could opt to monitor when and how frequently their users switch out of and back to their apps. The utility that this insight provides includes but are not limited to 1) improving the user experience, 2) providing timely incentives to encourage feature adoption/usage, or 3) detecting potential fraud. A mobile app has several options upon receiving the device intelligence during the continuous risk assessment. These options include, but are not limited to: (1) do nothing and continue with normal operations if all indicators are normal (for example, if no switching of apps was detected and the risk score is within acceptable range); (2) continue monitoring the device and said user account if only some indicators show elevated risk (for example, if no switching of apps was detected, but the risk score is in the moderate range); (3) end the user a promotion code or coupon through the app or other channels—such as using a text message or email, if indicators reflect the user was hesitant (for example, if frequent app-switching was detected), signaling risk of the user dropping off, or comparing features/offers between competitors; (4) send the user a warning through the app or other channels—such as using a text message or email, if indicators reflect significantly elevated risk (for example, if multiple risk indicators were positive, and the risk score is in the high-risk region), signaling risk of the user conducting fraud;

(5) if the current user is a victim of fraud, the current session can be terminated, and the account locked until the user can be alerted, and remedy is possible; and (6) log the device intelligence and any useful data points for future analytics to help improve the user experience.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered as illustrative and not restrictive, and the body of work described herein is not to be limited to the details given herein, which may be modified within the scope and equivalents of the appended claims.

What it claimed is:

1. A method for enhancing the security of a mobile device running a mobile application and communicating with a server, the method comprising: on the mobile device, continuously monitoring a plurality of parameters of the mobile device associated with installing, loading or running the mobile application for one or more predetermined triggering events;

on the mobile device, upon detecting one or more of said triggering events, executing a fingerprinting routine configured to obtain a current state of a plurality of device fingerprint attributes of the mobile device; transmitting said current state of the plurality of device fingerprint attributes of the mobile device to a risk engine running on the server; analyzing with said risk engine said current state of the plurality of device fingerprint attributes of the mobile device to obtain device intelligence information, said analyzing including comparing said current state of the plurality of device fingerprint attributes of the mobile device with a previously obtained state of the plurality of device fingerprint attributes of the mobile device, wherein the plurality of device fingerprint attributes are associated with the installing, loading and running of the mobile application on the mobile device; and transmitting said device intelligence information to said mobile device; and on the mobile device, undertaking one or more actions based on the intelligence information received from the server.

2. The method according to claim 1 further comprising saving to database information indicative of the current state of a plurality of device fingerprint attributes of the mobile device.

3. The method according to claim 2 wherein said information indicative of the current state of a plurality of device fingerprint attributes of the mobile device is a delta between the mobile device fingerprint attributes at the current state and at a previous state of the mobile device.

4. The method according to claim 1 wherein said device intelligence information includes a quantitative risk score that indicates the level of risk associated with the current mobile application session on the mobile device.

5. The method according to claim 1 wherein said device intelligence information includes qualitative information indicative of what types of trigger events are associated with the current mobile application session on the mobile device.

6. The method according to claim 1 wherein said one or more actions include one or more of the following: continue monitoring the mobile device, send the user a warning, terminate a user running the mobile application, and shut down the mobile application.

7. The method according to claim 1 wherein said one or more predetermined triggering events include one or more event types selected from a list consisting of the following events at the mobile device: a risk module is installed; a risk module is initialized; the mobile application is resumed; a display configuration has been changed; a screenshot is taken; a GPS provider change is detected; a network change is detected; and a change in tools is detected.

8. The method according to claim 1 wherein said plurality of device fingerprint attributes of the mobile device includes fingerprint attributes from one or more attribute categories selected from a list consisting of: device hardware;

network; software; screen; and location.

9. A system for enhancing security of a mobile device running a mobile application and communicating with a server running a risk engine platform, the system comprising: a mobile application running on the mobile device, the mobile application configured to continuously monitor a plurality of parameters at the mobile device associated with the mobile application for one or more predetermined triggering events, and upon detecting one more of said triggering events, execute a fingerprinting routine at the mobile device configured to obtain a current state of a plurality of device fingerprint attributes of the mobile device, and transmit said current state of the plurality of device fingerprint attributes of the mobile device to a risk engine running on the server; and running said risk engine platform to analyze the received current state of the plurality of device fingerprint attributes of the mobile device to obtain device intelligence information, said analysis including comparing said current state of the plurality of device fingerprint attributes of the mobile device with a previously obtained state of the plurality of device fingerprint attributes of the mobile device, wherein the plurality of device fingerprint attributes are associated with the installing, loading and running of associated said mobile application at the mobile device, and transmit said device intelligence information to said mobile device, wherein said mobile application is further configured to undertake one or more actions at the mobile device based on the intelligence information received from the server platform.

10. The system according to claim 9 wherein said server is further configured to save to a database information indicative of the current state of a plurality of device fingerprint attributes of the mobile device.

11. The system according to claim 10 wherein said information indicative of the current state of a plurality of device fingerprint attributes of the mobile device is a delta between the device fingerprint attributes at the current state of the mobile device and at a previous state of the mobile device.

12. The system according to claim 9 wherein said device intelligence information includes a quantitative risk score that indicates the level of risk associated with the current mobile application session at the mobile device.

13. The system according to claim 9 wherein said device intelligence information includes qualitative information indicative of what types of trigger events are associated with the current mobile application session at the mobile device.

14. The system according to claim 9 wherein said one or more actions include one or more of the following events at the mobile device: continue to monitor the mobile device, send the user a warning, terminate a user running the mobile application, and shut down the mobile application.

15. The system according to claim 9 wherein said one or more predetermined triggering events include one or more event types selected from a list consisting of the following events at the mobile device: a risk module is installed; a risk module is initialized; the mobile application is resumed; a display configuration has been changed; a screen shot is taken; a GPS provider change is detected; a network change is detected; and a change in tools is detected.

16. The system according to claim 9 wherein said plurality of device fingerprint attributes includes one or more fingerprint attributes types from a list consisting of the following attributes of the mobile device: device hardware—device brand, device name, device model, IMEI, battery level, battery temperature, brand, manufacturer, model, hardware, host, device, ID and CPU; network-carrier name, carrier country, battery technology, battery voltage, battery health, carrier country code, carrier network code, Wi-Fi name, Wi-Fi IP address and WIFI mac address; software—OS version, merchant app version, version incremental, version release and version codename; screen—screen resolution, screen size, pixel density and display; location—GPS country, GPS coordinates, IP country and IP address; and miscellaneous—timezone, user language and user agent.

* * * * *